United States Patent
Moyer et al.

(10) Patent No.: US 7,249,223 B2
(45) Date of Patent: Jul. 24, 2007

(54) PREFETCHING IN A DATA PROCESSING SYSTEM

(75) Inventors: William C. Moyer, Dripping Springs, TX (US); Craig D. Shaw, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 301 days.

(21) Appl. No.: 10/916,298

(22) Filed: Aug. 11, 2004

(65) Prior Publication Data

US 2006/0036812 A1    Feb. 16, 2006

(51) Int. Cl.
  *G06F 12/00* (2006.01)
(52) U.S. Cl. .................. 711/137; 711/103; 711/104; 711/105; 711/167
(58) Field of Classification Search ................ 711/167, 711/103, 104, 105, 137
  See application file for complete search history.

(56) References Cited

U.S. PATENT DOCUMENTS

| | | | | |
|---|---|---|---|---|
| 5,329,621 A | | 7/1994 | Burgess et al. | |
| 5,459,847 A | * | 10/1995 | Okamura | 711/213 |
| 5,941,981 A | * | 8/1999 | Tran | 712/207 |
| 6,523,093 B1 | * | 1/2001 | Bogin et al. | 711/137 |
| 6,567,880 B1 | * | 1/2001 | Olarig | 710/306 |
| 6,898,674 B2 | * | 1/2001 | Maiyuran et al. | 711/137 |
| 6,970,978 B1 | * | 1/2001 | Wu | 711/137 |
| 6,317,811 B1 | | 11/2001 | Deshpande | |
| 6,643,766 B1 | | 11/2003 | Lesartre | |
| 6,810,466 B2 | | 10/2004 | Henry et al. | |
| 2004/0088490 A1 | * | 5/2004 | Ghosh | 711/137 |
| 2004/0123021 A1 | * | 6/2004 | Minami | 711/105 |
| 2004/0215891 A1 | * | 10/2004 | Dodson et al. | 711/137 |
| 2004/0221111 A1 | * | 11/2004 | Phelps et al. | 711/137 |
| 2005/0198439 A1 | * | 9/2005 | Lange et al. | 711/137 |

* cited by examiner

*Primary Examiner*—Reginald Bragdon
*Assistant Examiner*—Aracelis Ruiz
(74) *Attorney, Agent, or Firm*—Daniel D. Hill; Joanna G. Chiu

(57) ABSTRACT

A method and apparatus is provided for prefetching in a data processing system (10). The data processing system (10) has a bus master (14) and a memory controller (16) coupled to a bus (12). A memory (18) is coupled to the memory controller (16). In the data processing system (14) an address is driven onto the bus (12). Before the address is qualified, data corresponding to the address is prefetched. Prefetching the data before the address is qualified allows prefetches to be accomplished sooner.

9 Claims, 4 Drawing Sheets

PREFETCHING IN A DATA PROCESSING SYSTEM

FIELD OF THE INVENTION

The present invention relates generally to a data processing system, and more particularly, to prefetching in a data processing system.

RELATED ART

Prefetching is commonly used to access information within a data processing system. By prefetching information in advance of a request for that information, the latency caused by accessing the information requested by a bus master may be reduced. However, the use of a prefetch mechanism increases the power consumption in a data processing system and uses other resources. Therefore, there is a need for a data processing system and method that reduces the amount of time required to prefetch data, resulting in reduced power consumption and an optimization of data processor performance.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Generally, the present invention provides a prefetch mechanism in a data processing system to allow an address to be prefetched sooner than has been accomplished in the past. This is realized by initiating a prefetch operation on an unqualified address that is driven on the bus. An address is unqualified when the address has not yet been accepted by the memory system as taken. The memory system is considered to have accepted an address as taken when the data transfer corresponding to the previous access address has been completed.

Figure 2:
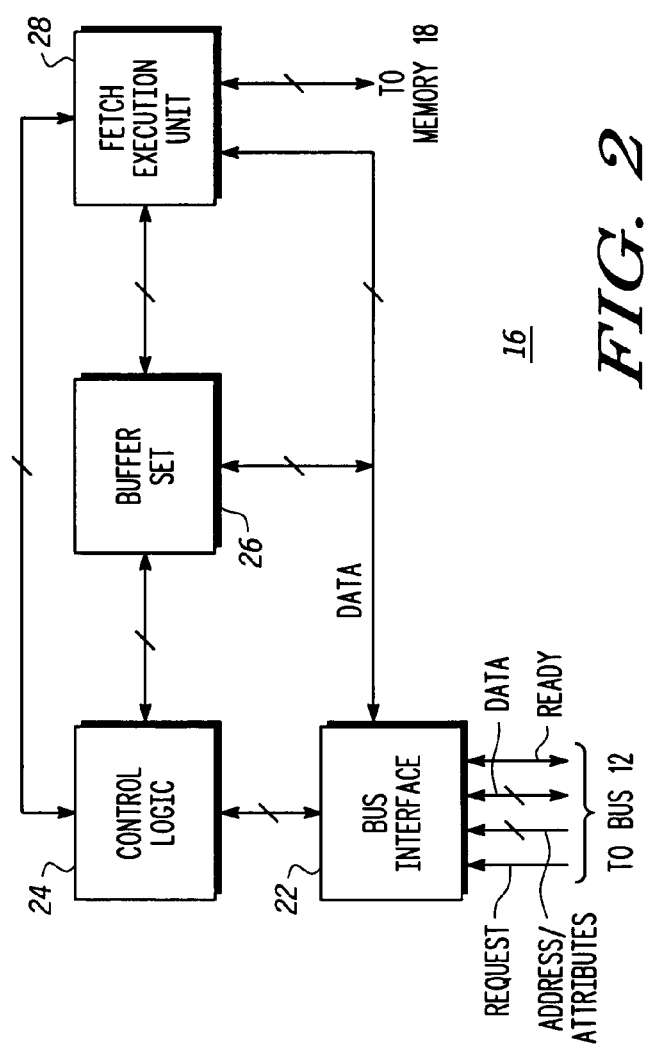
FIG. 2 illustrates, in block diagram form, the memory controller of the data processing system of FIG. 1 in more detail.

The memory controller of FIG. 2 is connected to bus 12, and is therefore able to observe and drive the applicable signals of bus 12.

The described embodiment of the invention is useful in a data processing system that uses the AMBA Advanced High-performance Bus (AMBA AHB) protocol. The AMBA AHB protocol overlaps address and data phases, such that the address phase of a new access overlaps the data phase of the previous access. The new address' access is not considered to be qualified until the previous address' data phase is completed. In many cases, an access requires more than one clock cycle to complete. In accordance with the illustrated embodiment of the present invention, during a multi-cycle access, a prefetch operation can be accomplished. Since the address presented on the bus has a relatively high probability of remaining on the bus and ultimately becoming the qualified address, the system memory access latency may be reduced and the performance of the system is increased.

Figure 1:
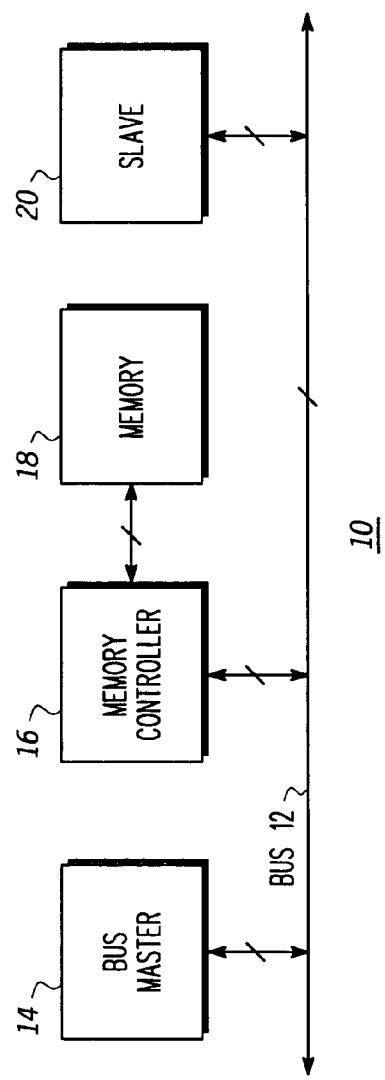
FIG. 1 illustrates, in block diagram form, a data processing system in accordance with one embodiment of the present invention.

FIG. 1 illustrates, in block diagram form, a data processing system 10 in accordance with one embodiment of the present invention. Data processing system 10 includes a bus 12, a bus master 14, a memory controller 16, a memory 18, and a slave device 20. The bus master 14, memory controller 16, and slave 20 are all bi-directionally coupled to the bus 12. The memory 18 is bi-directionally coupled to the memory controller 16.

Note that although only one master and one slave are illustrated in FIG. 1, any number of masters and slaves may be coupled to bus 12. Note also that in one embodiment, all of data processing system 10 may be located on a single integrated circuit or within a same device. Alternatively, data processing system 10 may include any number of separate integrated circuits or separate devices interconnected with each other. For example, in one embodiment, the memory 18 and memory controller 16 may be located on one or more integrated circuits, separate from the rest of data processing system 10.

The memory 18 may be any type of memory, such as, for example, a read only memory (ROM), a random access memory (RAM), non-volatile memory (e.g. Flash), etc. Also, memory 18 may be a memory or other storage located within another peripheral or slave or on a different integrated circuit.

In one embodiment, bus master 14 may be a processor capable of executing instructions, such as a microprocessor, digital signal processor, etc., or may be any other type of bus master, such as for example, a direct memory access (DMA) controller, debug circuitry, or the like. Note that other slave devices 20 may be included, such as for example, another memory accessible by the bus master 14, as well as any type of peripheral circuit which resides on the system bus.

FIG. 2 illustrates, in block diagram form, the memory controller 16 of the data processing system 10 in more detail. The memory controller 16 includes a bus interface 22, a control logic 24, a buffer set 26, and a fetch execution unit 28. The bus interface 22 is bi-directionally coupled to the bus 12 (FIG. 1). The bus interface 22 functions as the interface for the transfer of data, address, and control signals between the memory controller 16 and the bus 12. Some of these signals are illustrated in FIG. 2. For example, bus interface 22 receives an access request signal labeled "REQUEST" and an address labeled "ADDRESS/ATTRIBUTES" from bus 12. Also, bus interface 22 sends or receives data signals labeled "DATA" and sends or receives a ready signal labeled "READY". For the purpose of brevity, there may other signals as well that are not illustrated in FIG. 2.

Figure 3:
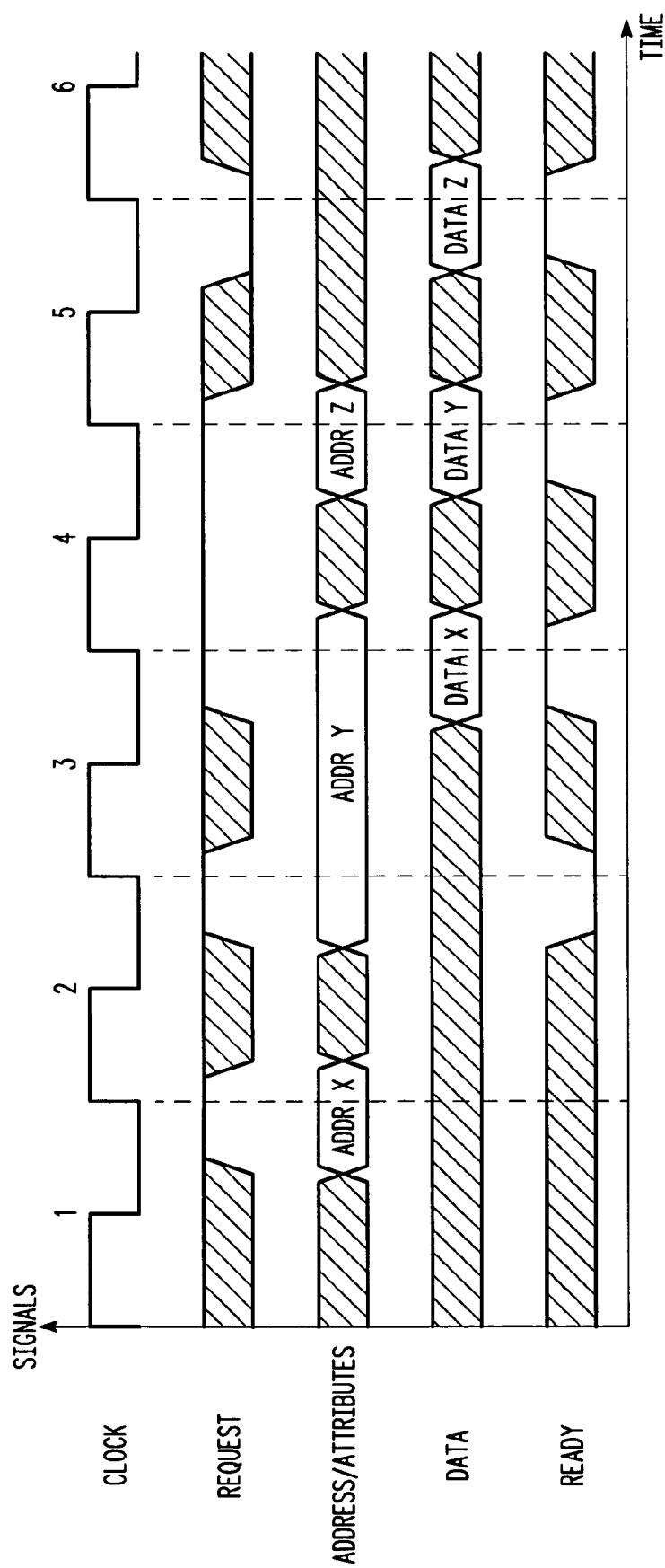
FIG. 3 illustrates a timing diagram of various signals useful for understanding the present invention.

FIG. 3 illustrates a timing diagram of various signals of the memory controller 16 that are useful for understanding the present invention. FIG. 3 illustrates an access to an address X, which requires two clock cycles to get valid data. This is illustrated by the lack of valid data at the end of clock cycle 2, as indicated by the READY signal being low at the end of cycle 2. The READY signal is active at a logic high. The data associated with address X becomes valid in clock cycle 3, as indicated by the READY signal being high at the end of clock cycle 3. Due to the extension of the data phase related to address X, the address phase of address Y is also extended by one clock. In accordance with the embodiment of the present invention, a prefetch of address Y can begin at the end of cycle 2, whereas the prior art would not begin a fetch of address Y until the end of cycle 3, once the address becomes qualified. Note that in the illustrated embodiment, the present invention may only apply to prefetching addresses with certain attributes, for example, only addresses for a read operation are prefetched. In other embodiments, the present invention may be applied to addresses with different attributes, or may be conditionally applied to a subset of access types indicated by the attributes.

Figure 4:
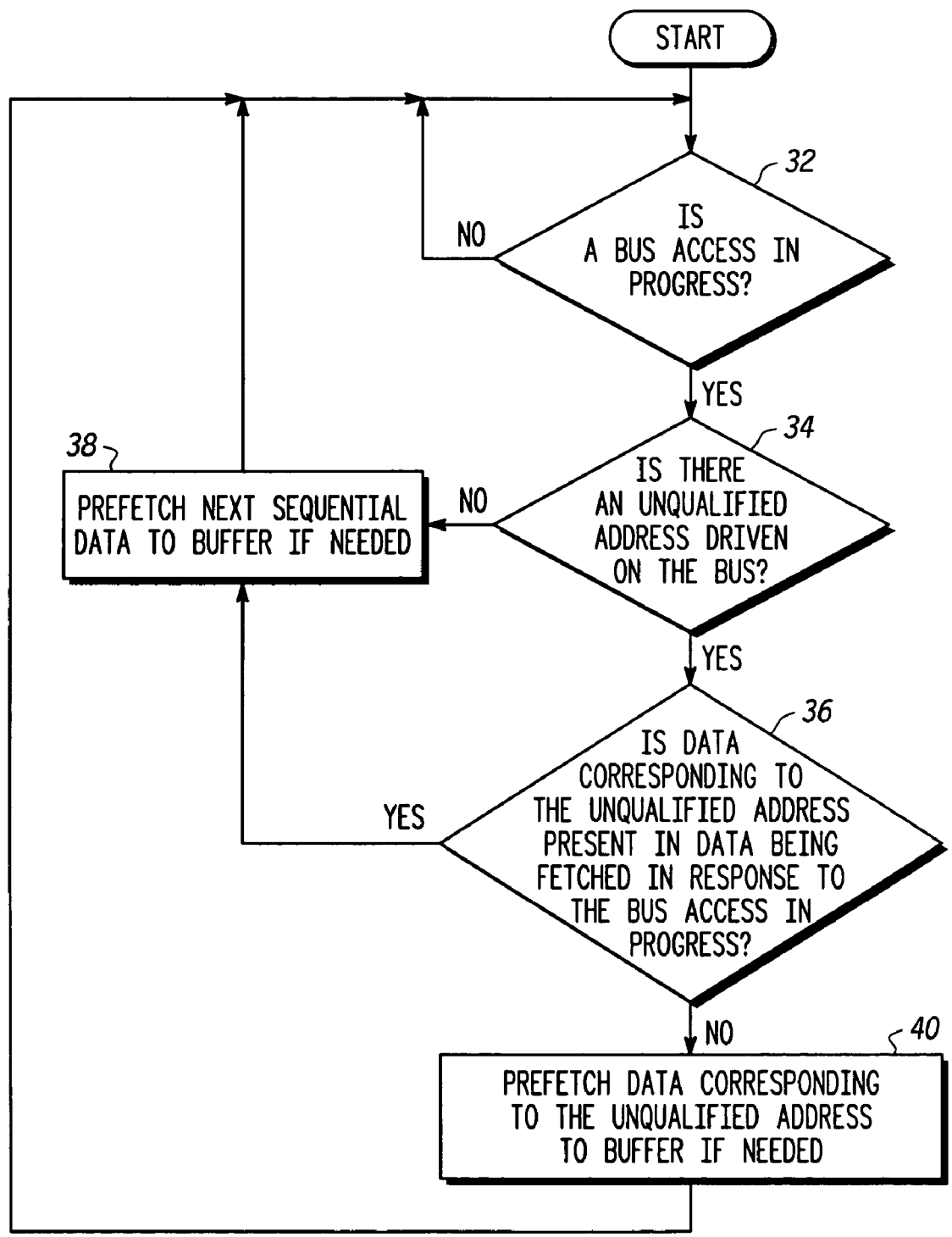
FIG. 4 illustrates a flow chart of a prefetch operation in accordance with one embodiment of the present invention.

FIG. 4 illustrates a flow chart of a prefetch operation in accordance with one embodiment of the present invention. At a decision step 32, it is determined if a bus access to bus 12 is in progress. If a bus access is not in progress, the flow diagram takes the "NO" path back to the beginning of step 32. If a bus access is in progress, the "YES" path is taken to decision step 34. At decision step 34, it is determined if an unqualified address is driven on the bus 12. If an unqualified address in not being driven on the bus, then the "NO" path is taken to step 38. In this case, the bus is currently idle, with no address information available. At step 38 the next sequential data is prefetched from memory and provided to the buffer if needed. The next sequential data address is generated based on the size of the buffers in buffer set 26. If the size of the buffer is 'N' bytes, the next sequential data corresponds to the address of the current data incremented by 'N'. In many embodiments, the next sequential data is frequently accessed following access to the current data, thus performing the prefetch in advance can hide the latency of access to memory, and thus increase overall system performance. Alternate embodiments may choose a different prefetch strategy, involving different address selection means, or may condition the prefetch of additional data based on state information available from the system, and perform prefetching conditionally, based on decisions made utilizing various available information. Following step 38, the flow then returns to the beginning step 32. If an unqualified address is being driven on the bus, then the "YES" path is taken to decision step 36. At decision step 36, it is determined if data corresponding to the unqualified address is present in data being fetched in response to the bus access in progress. If the data is present in data that is already being fetched, then the "YES" path is taken to the beginning of step 32. The data corresponding to the unqualified address may be present in the data already being fetched, since in at least one embodiment, the fetched data corresponds to multiple consecutive bytes of data needed to fill a buffer in buffer set 26, and the unqualified address may fall within the contents of buffer fill data. If the data is not present, then the "NO" path is taken to step 40. At step 40, data corresponding to the unqualified address is prefetched to a buffer of buffer set 26 if needed. Although the unqualified address may not actually be requested, it serves to provide a prefetch hint which may be more accurate than other methods of prefetch address selection. Note that in steps 38 and 40 the data is needed if the data is not already present in the buffer set 26 of the memory controller 16. Prior to qualification of the unqualified address, the unqualified value may change in response to internal conditions within the bus master. This may occur one or more times prior to ultimate qualification of the address. In one embodiment, the flow diagram illustrated in FIG. 4 may be transitioned through each time an unqualified address is presented. If multiple unqualified addresses are generated, multiple prefetches may be generated. In alternate embodiments, the number of transitions through the flow diagram of FIG. 4 may be limited, such that only a single prefetch is conditionally generated (based on decisions in step 38 and step 40) for each bus access, or the number of prefetch operations may be limited to a configurable value.

Figure 5:
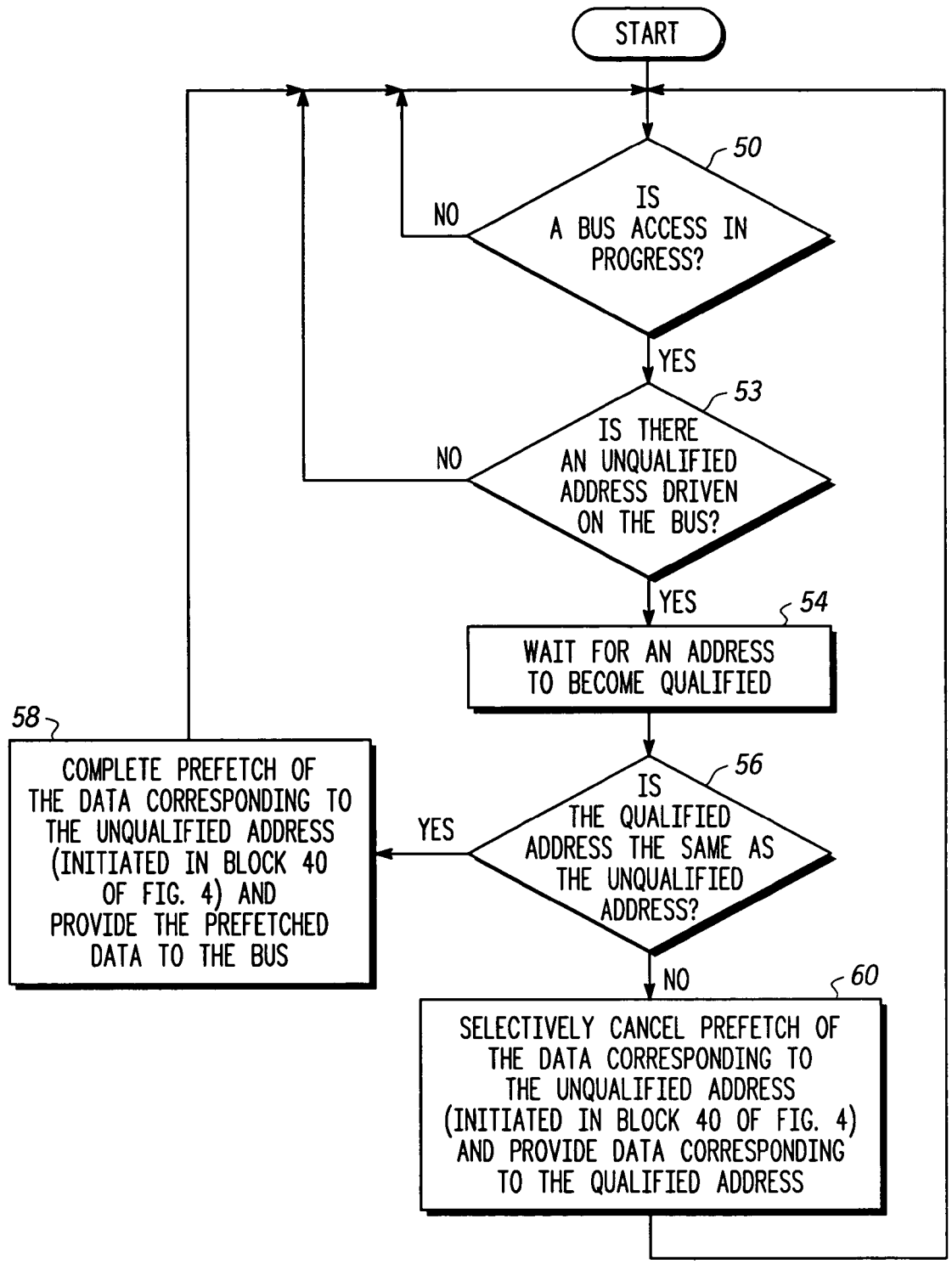
FIG. 5 illustrates a flow chart for validating the prefetch operation of FIG. 4.

FIG. 5 illustrates a flow chart for validating the prefetch operation of FIG. 4. When prefetching an as yet unqualified address, it is necessary to ensure that the upcoming qualified address matches the address prefetched. The initial unqualified address may not be the same as the address that is ultimately qualified because it may be based on, for example, a mispredicted branch, or the preceding access may result in a transfer error which necessitates an immediate change of flow due to the exception. Prior to qualification of the unqualified address, the unqualified value may change in response to internal conditions within the bus master. This may occur one or more times prior to ultimate qualification of the address. If the prefetched address does not match the ultimately qualified address, the prefetched data will not be relevant to the qualified access, and the qualified access must be fetched, otherwise the incorrect data would be returned. Thus, FIG. 5 illustrates a procedure for guaranteeing the correct data is fetched and returned to bus 12.

In FIG. 5, at step 50, it is determined if a bus access is in progress. If a bus access is not in progress, then the flow returns to the beginning of step 50. If a bus access is in progress, then the "YES" path is taken to decision step 53. At decision step 53, it is determined if there is an unqualified address driven on the bus. If there is not an unqualified address driven on the bus, then the "NO" path is taken to the beginning of step 50. If there is an unqualified address driven on the bus, then the "YES" path is taken to step 54. At step 54 the memory controller 16 waits for an address to become qualified. At decision step 56 it is determined if the qualified address is the same as the unqualified address. If the qualified address is the same, then the "YES" path is taken to step 58. At step 58, prefetch of the data corresponding to the unqualified address is completed and provided to the bus. The prefetch of the data was initiated in step 40 of FIG. 4. If at step 56, the qualified address is not the same as the unqualified address, then the "NO" path is taken to step 60. At step 60, the memory controller 16 selectively cancels the prefetch of the data corresponding to the unqualified address and provides the data corresponding to the qualified address.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The terms a or an, as used herein, are defined as one or more than one. The terms including and/or having, as used herein, are defined as comprising (i.e., open language). As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for prefetching in a data processing system having a bus master, a memory system, and a bus, the bus master and the memory system coupled to the bus, the method comprising:
   initiating an access to the memory system, wherein the access requires more than one clock cycle to complete;
   determining whether an unqualified address is driven on the bus, wherein the unqualified address is unqualified until accepted by the memory system as taken; and
   determining that the unqualified address is driven on the bus but not taken, and in response, prefetching data corresponding to the unqualified address, wherein the prefetching of the data corresponding to the unqualified address is initiated while the access to the memory system is in progress and the prefetching of the data is not related to the access to the memory system.

2. The method of claim 1, wherein the data processing system includes a memory controller coupled to the bus, and wherein prefetching the data corresponding to the unqualified address comprises:
   prefetching the data corresponding to the unqualified address if the data corresponding to the unqualified address is not present in a data buffer of the memory controller.

3. The method of claim 1, wherein in response to determining that the unqualified address is driven on the bus, the method further comprises:
   determining whether the data corresponding to the unqualified address is present within data being fetched in response to the bus access, wherein the prefetching the data corresponding to the unqualified address is performed if the data corresponding to the unqualified address is not present.

4. The method of claim 3, wherein the data processing system includes a memory controller coupled to the bus, and wherein prefetching the data corresponding to the unqualified address comprises:
   prefetching the data corresponding to the unqualified address if the data corresponding to the unqualified address is not present in a data buffer of the memory controller.

5. The method of claim 1, further comprising:
   in response to determining that the unqualified address is not driven on the bus, prefetching data corresponding to an address sequential to an address of the access to the memory system.

6. The method of claim 5, wherein the data processing system includes a memory controller coupled to the bus, and wherein prefetching data sequential to the access address comprises:
   prefetching the data corresponding to the address sequential to the access address if the data corresponding to the address sequential to the access address is not present in a data buffer of the memory controller.

7. The method of claim 5, wherein the address sequential to the access address is generated based on a width of a data buffer of the memory controller.

8. The method of claim 1, further comprising:
   qualifying an address, wherein the qualifying is performed after initiating the prefetching of the data corresponding to the unqualified address.

9. The method of claim 8 further comprising:
   if the qualified address and the unqualified address are a same address, completing the prefetch of the data corresponding to the unqualified address; and
   if the qualified address and the unqualified address are not the same address, canceling the prefetch of the data corresponding to the unqualified address.

* * * * *